(12) United States Patent
Keller et al.

(10) Patent No.: US 7,004,138 B2
(45) Date of Patent: Feb. 28, 2006

(54) PRESSURE PULSE COMMUNICATION IN AN ENGINE INTAKE MANIFOLD

(75) Inventors: Robert D. Keller, Davisburg, MI (US); Marc H. Sanderson, Clarkston, MI (US); Kevin Petri, Lapeer, MI (US); Robert J. Boychuk, Sterling Heights, MI (US)

(73) Assignee: Eaton Corporation, Cleveland, OH (US)

( * ) Notice: Subject to any disclaimer, the term of this patent is extended or adjusted under 35 U.S.C. 154(b) by 4 days.

(21) Appl. No.: 10/620,114

(22) Filed: Jul. 15, 2003

(65) Prior Publication Data

US 2005/0011490 A1    Jan. 20, 2005

(51) Int. Cl.
F02M 35/10    (2006.01)

(52) U.S. Cl. .................... 123/184.53; 123/184.59; 251/305

(58) Field of Classification Search ........ 123/184.21–184.61; 251/305
See application file for complete search history.

(56) References Cited

U.S. PATENT DOCUMENTS

| | | | | |
|---|---|---|---|---|
| 3,883,277 A | * | 5/1975 | Keller | 418/137 |
| 4,417,560 A | * | 11/1983 | Frank | 123/559.1 |
| 4,465,034 A | * | 8/1984 | Tsutsumi | 123/306 |
| 4,704,996 A | * | 11/1987 | Morikawa | 123/188.14 |
| 5,085,177 A | * | 2/1992 | Ma | 123/405 |
| 6,036,172 A | * | 3/2000 | Pajard | 251/250 |
| 6,067,961 A | * | 5/2000 | Kato | 123/399 |
| 6,598,854 B1 | * | 7/2003 | Jessberger et al. | 251/214 |
| 6,698,717 B1 | * | 3/2004 | Brookshire et al. | 251/305 |
| 6,722,335 B1 | * | 4/2004 | Nomura et al. | 123/184.59 |
| 6,761,348 B1 | * | 7/2004 | Michels et al. | 251/305 |
| 6,908,072 B1 | * | 6/2005 | Hattori | 251/306 |
| 2002/0130284 A1 | | 9/2002 | Knebel et al. | 251/11 |
| 2003/0056790 A1 | | 3/2003 | Nichols et al. | 128/203.16 |
| 2003/0057300 A1 | | 3/2003 | Peterson, Jr. | 239/533.12 |

* cited by examiner

Primary Examiner—Marguerite McMahon
(74) Attorney, Agent, or Firm—Anna M. Shih; Roger A. Johnston

(57) ABSTRACT

A servo-operated rotary vane valve is intended for external assembly through an opening in an engine inlet manifold passage with an integral rib formed therein. Baffling surfaces on the edge of the vane minimize pressure pulse communication over the rib when the valve is in the closed position.

14 Claims, 5 Drawing Sheets

PRESSURE PULSE COMMUNICATION IN AN ENGINE INTAKE MANIFOLD

BACKGROUND OF THE INVENTION

The present invention relates to servo operated valves and particularly servo operated rotary valves for use in an engine to control pressure pulse communication between different channels in an engine inlet manifold.

In the design and manufacture of engines for passenger cars and light trucks, it has been found desirable to provide alternate runners or channels in the engine inlet manifold for providing pressure pulse communication at different rates according to the engine operating speed and load. In particular it has been desired to prevent pressure pulse communication for use at low speeds and low loads; whereas for high speed or high loads it has been required to allow pressure pulse communication.

In known production engines for light vehicles, an electrically operated rotary vane valve has been employed in the engine manifold to control the opening and closing of such additional or secondary passages as required by the engine operating conditions. Such valves are typically installed through an access opening in the manifold to position the rotary vane at the inlet end of the secondary passages with the vane contacting a rib or stop surface provided in the manifold, for example, by integral molding therein. However, in view of the variation in dimensions between the parts and the variation in the positioning of the valve vane upon assembly into the manifold, it has been found difficult to provide a valve installation which eliminates pressure pulse communication in the secondary passages when the valve vane is in the closed position. This problem is particularly aggravated by the nature of the valve construction because it is required that the servo motor actuator for the valve be disposed externally of the airflow passage in the manifold. The valve must be assembled through an access opening in the manifold rather than built in during forming of the manifold.

Thus, it has been desired to provide an inexpensive relatively simple and easy to install diverter valve for an engine air inlet manifold which prevents residual pressure pulse communication in the secondary passages when the valve is in the closed position.

BRIEF SUMMARY OF THE INVENTION

The present invention provides a solution to the above-described problem and presents an assembly of a servo motor and rotary vane valve adapted for installation through an access opening in an engine air inlet manifold and has provisions on the vane for the baffling surface to break up pressure pulses around the vane when the valve is in the closed position for the intended passage in the manifold. The valve vane may be integrally formed with an offset surface or flap which provides the baffling surface when the vane is in the closed position with respect to a rib or stop provided in the inlet passage.

DETAILED DESCRIPTION OF THE INVENTION

Figure 1:
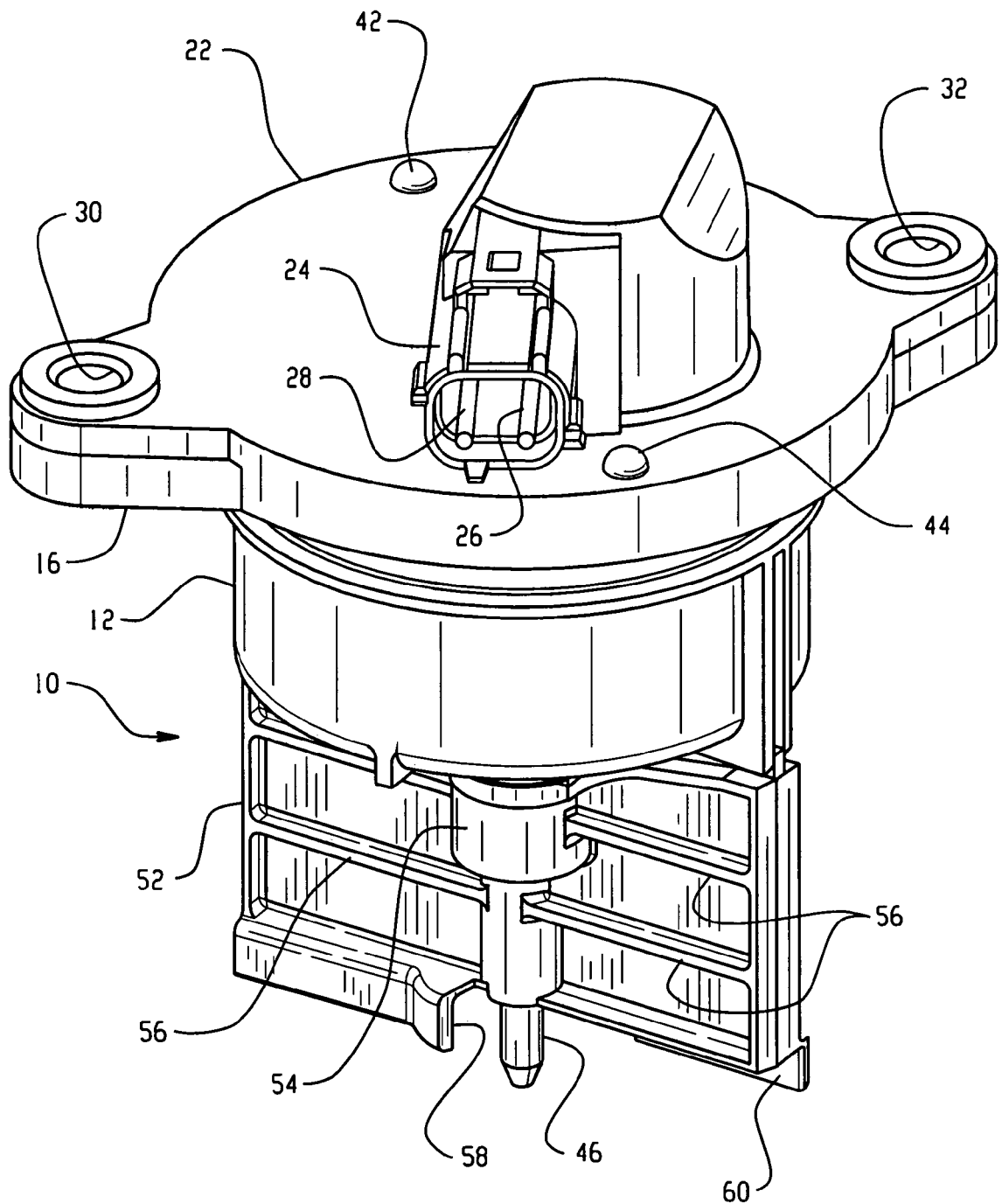
FIG. 1 is a perspective view of the valve assembly of the present invention.
Figure 2:
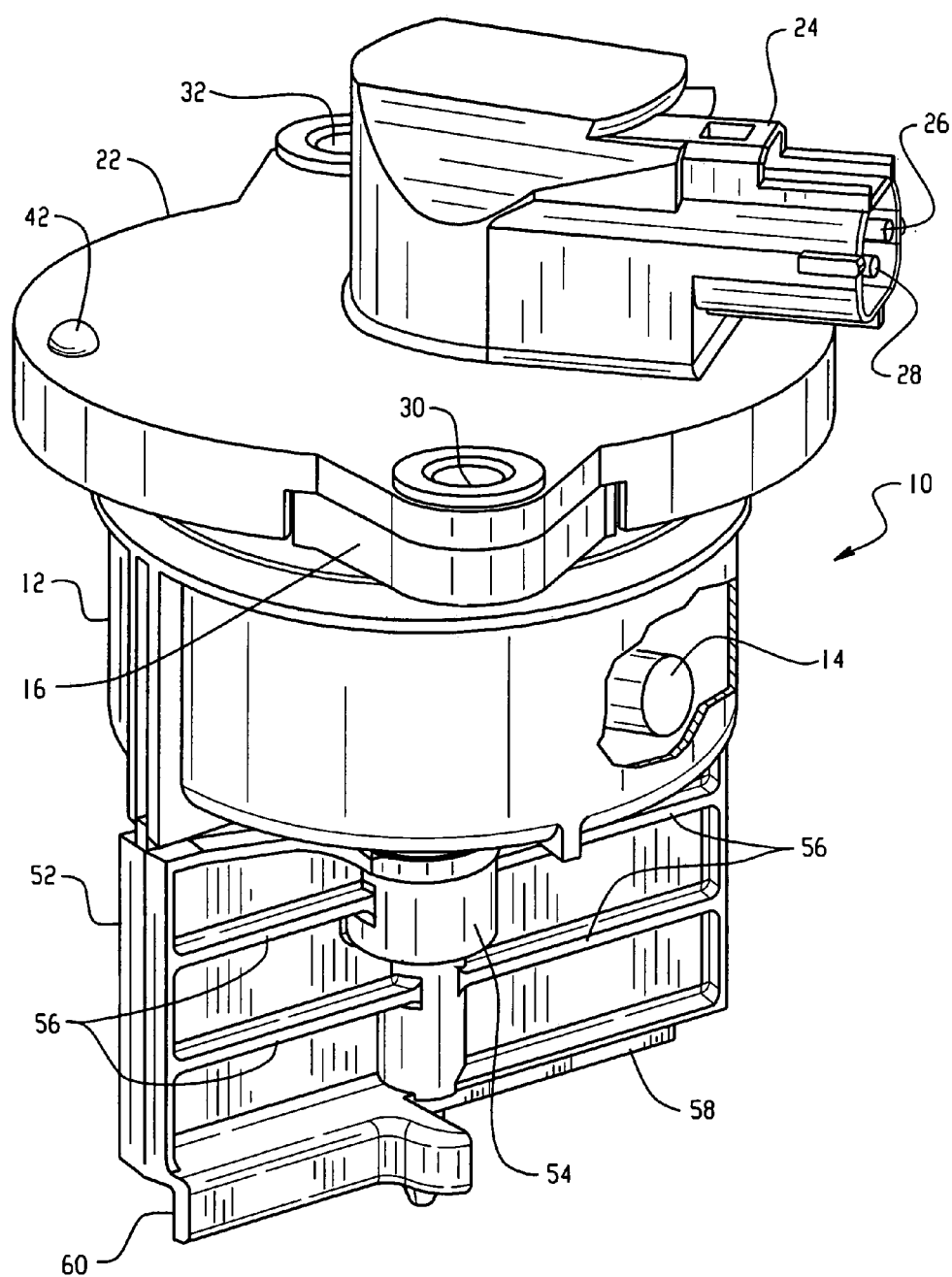
FIG. 2 is a view similar to FIG. 1 taken from the left-hand side with a portion of the housing broken away.
Figure 3:
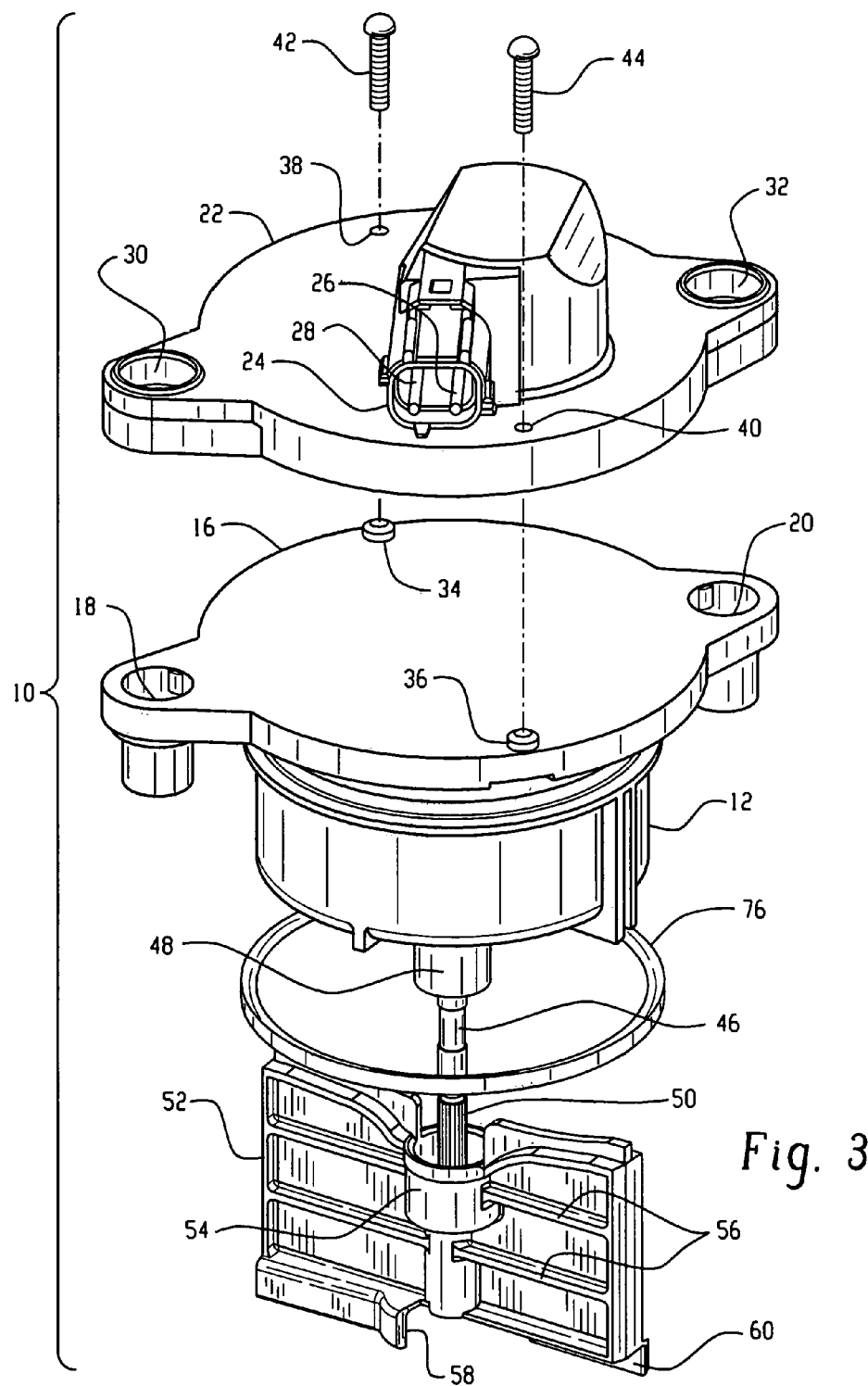
FIG. 3 is an exploded view of the assembly of FIG. 1.

Referring to FIGS. 1 through 3, the valve assembly of the present invention is indicated generally at 10 and includes a housing 12 which has a motor drive unit 14 disposed therewithin which may include a speed reducer (not shown). The housing 12 preferably includes a mounting flange 16 having apertures 18, 20 formed therein for receiving therethrough suitable fasteners (not shown) for attachment to an intake manifold as will hereinafter be described.

Mounting flange 16 has mounted thereover a cap 22 which has formed therein an electrical receptacle shell 24 which has electrical terminal pins 26, 28 disposed therein for external electrical connection thereto. The terminal pins are internally connected by suitable electrical leads (not shown) to motor drive 14. Cap 22 also has apertures 30, 32 formed therein located to coincide with apertures 18, 20 of the flange 16 for receiving suitable mounting fasteners (not shown) therethrough.

Flange 16 preferably has a pair of spaced raised bosses 34, 36 formed thereon, each of which has therethrough a hole adapted for receiving a fastener. Cap 22 has correspondingly located holes 38, 40 formed therein, each of which has received therethrough a suitable fastener denoted 42, 44 respectively. In the present practice of the invention fasteners 42, 44 comprise rivets; however, it will be understood that other suitable types of fasteners may be employed as, for example, screws with retaining nuts or self-tapping fasteners.

The housing has a shaft 46 received through an unshown opening provided in the lower end of an extension 48 formed on the bottom of housing 12; and, it will be understood that the shaft 46 is operatively engaged with the motor drive 14 which may include a suitable speed reducer (not shown). The lower end of the shaft 46 preferably has driving surfaces 50 provided thereon such as, for example, a knurled surface or splines. It will be understood however that other configurations may be employed such as a hexagonal or square in cross-section configuration.

A vane type valve member 52 has a central hub 54 into which is received the lower end of shaft 46, it being understood, that hub 54 has provided therein suitable surfaces corresponding to the driving surfaces 50 on the shaft for transmitting torque from the shaft to the vane. In the present practice of the invention, vane 52 and hub are formed integrally as one piece, such as by molding, and preferably, has a plurality of radially outwardly extending stiffening ribs 56 formed thereon.

The lower edge of the vane 52 has provided thereon, on opposite sides of the hub 54, a pair of oppositely directed baffles or baffling surfaces 58, 60 which may be formed by an offset or flap formed on the bottom edge of the vane. The baffling surfaces 58, 60 function in a manner as will be hereinafter described.

Figure 4:
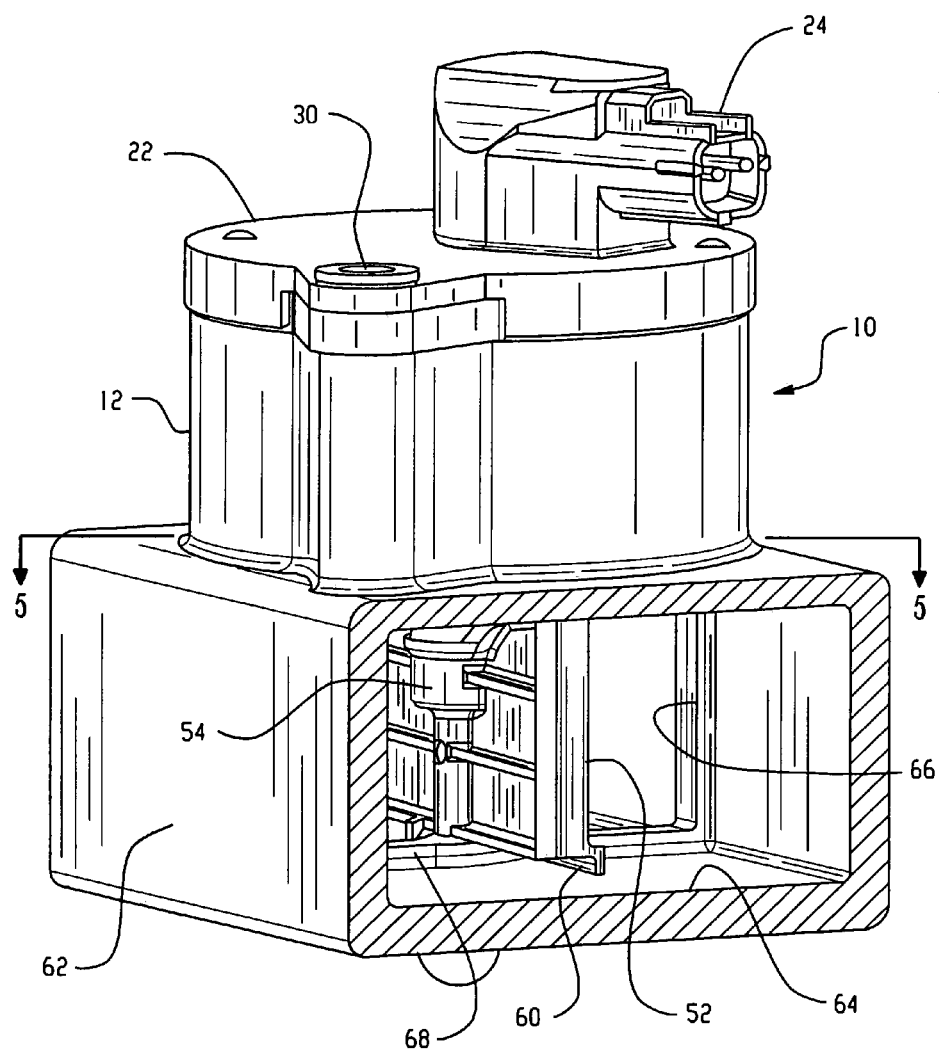
FIG. 4 is a perspective view of the valve of the present invention mounted in a section of an engine air inlet manifold; and, FIG. 5 is a section view taken along section-indicating lines 5—5 of FIG. 4.
Figure 5:
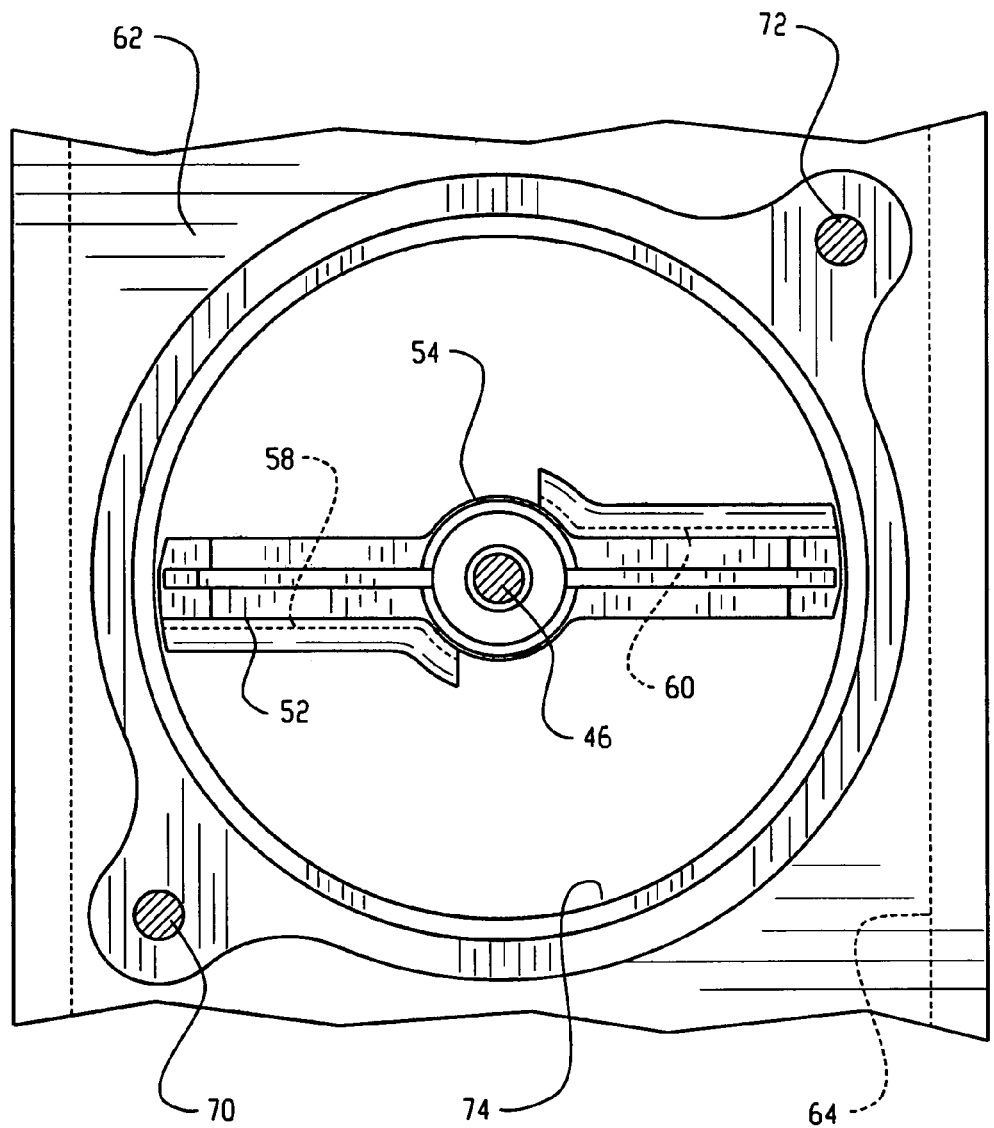

Referring to FIGS. 4 and 5, the valve assembly 10 is shown installed on an engine intake manifold having a portion thereof illustrated and denoted by reference numeral 62 and which has formed therein an auxiliary or secondary pressure pulse communication passage 64 having a typical rectangular cross-section as shown in FIG. 4.

The passage 64 has provided therein and disposed peripherally thereabout a raised rib 66 which has one edge thereof forming a seating surface denoted 68 for vane 52, which is shown in the fully open position in FIG. 4. With continuing reference to FIG. 4, the vane 52 is shown in the fully open position; and, when engine operating conditions require, an unshown controller energizes the motor drive unit which causes the vane to rotate in a clockwise direction to the closed position causing the baffling surface 60 to move to a post-adjacent rib 66; and, surfaces 58, 60 thereby provide baffling of the pressure pulse communication between the vane 52 and the rib minimizing pressure pulse building effects around the vane.

It will be understood that the assembly 10 is retained on the manifold by suitable fasteners (not shown) in FIGS. 1 through 4 received through the mounting hole 30, 32 and holes 18, 20 in the flange 16. The fasteners are shown in cross-section and denoted by reference numerals 70, 72 in FIG. 5. The aperture or mounting hole through which the assembly 10 is received in the manifold is denoted in FIG. 5 by reference numeral 74.

Referring to FIG. 3, upon installation of assembly 10 into opening 74, the undersurface of flange 16 is sealed about the access hole 74 by a suitable seal ring denoted by reference numeral 76.

The present invention thus provides a simple and relatively low-cost, easy to assemble, rotary servo operated valve for controlling pressure pulse communication in an engine manifold passage which may be assembled externally through an opening formed in the manifold and provides for sufficient baffling of the pressure pulse communication when the valve is in the closed position to minimize pressure pulse communication or leakage thereabout.

Although the invention has hereinabove been described with respect to the illustrated embodiments, it will be understood that the invention is capable of modification and variation and is limited only by the following claims.

What is claimed is:

1. In combination a motorized valve and engine air inlet manifold passage comprising:
   a manifold with an inlet passage having an access opening and a rib formed in the wall of the passage and extending thereacross in a direction transverse to a pressure pulse communication and located opposite said access opening;
   a valve housing with a motor drive therein with a flange extending outwardly therefrom;
   a valve vane operatively connected to said motor drive for rotation with respect to said housing upon energization of said motor drive, said vane disposed through said access opening and having at least one portion thereof configured for baffling the pressure pulse communication over said rib upon movement of the vane to a closed position with respect to the inlet passage; and
   at least one retainer that retains said flange on said manifold.

2. The combination defined in claim 1, wherein said valve housing has at least one portion thereof configured for being received in said access opening.

3. The combination defined in claim 1, wherein said at least one retainer comprises a plurality of threaded fasteners.

4. The combination defined in claim 1, wherein said valve vane is connected to said motor drive by a centrally disposed shaft.

5. The combination defined in claim 1, wherein said valve vane and said inlet passage have a rectangular cross section.

6. The combination defined in claim 1, wherein said valve vane includes a plurality of stiffening ribs formed integrally therewith.

7. The combination defined in claim 1, wherein said motor drive includes a rotatable shaft extending externally of the housing with said vane mounted thereon.

8. A method of controlling communication in an engine inlet manifold passage comprising:
   disposing a rib across one side of the passage in a direction transverse to a pressure pulse communication and forming an access opening in the passage at a location opposite said rib;
   disposing a motorized rotary drive in a housing;
   connecting a vane to said drive through an aperture in the housing;
   forming a baffling surface on an edge of said vane;
   inserting said vane through said access opening;
   positioning the vane for rotation with respect to said rib;
   energizing said motor drive to rotate said vane; and
   baffling the pressure pulse communication over said rib with said baffling surface when said vane is in a closed position with respect to said passage.

9. The method defined in claim 8, wherein said step of forming the baffling surface includes molding the baffling surface directly on the vane.

10. The method defined in claim 8, wherein said step of disposing a rib includes forming a seating surface on said rib, and wherein the step of positioning the vane comprises piloting the vane against the seating surface of said rib.

11. The method defined in claim 8, further comprising molding the vane out of resinous material and forming a driving surface on the vane, wherein the driving surface engages with the drive during the connecting step.

12. The method defined in claim 11, wherein said step of molding the vane includes integrally forming a hub with a plurality of outwardly extending stiffening ribs.

13. The method defined in claim 8, further comprising: forming an outwardly extending flange on the housing; and mounting the housing to the manifold by attaching the flange to the manifold.

14. The method defined in claim 8, wherein said step of forming a baffling surface includes forming a flap, which acts as the baffling surface, along one edge of the vane.

* * * * *